United States Patent [19]
Botti et al.

[11] Patent Number: 5,631,466
[45] Date of Patent: May 20, 1997

[54] APPARATUS AND METHODS OF CLOSED LOOP CALIBRATION OF INFRARED FOCAL PLANE ARRAYS

[75] Inventors: Dominic J. Botti, Torrance; Vernon F. Hutchens, Hermosa Beach, both of Calif.

[73] Assignee: Hughes Electronics, Los Angeles, Calif.

[21] Appl. No.: 491,134

[22] Filed: Jun. 16, 1995

[51] Int. Cl.$^6$ ................................................. G01J 5/10
[52] U.S. Cl. .................. 250/332; 250/252.1; 250/341.5; 364/571.05
[58] Field of Search ....................... 73/1 R; 250/252.1 R, 250/341.5, 332, 252.1 A; 364/571.04, 571.05, 571.06, 571.07, 571.08

[56] References Cited

U.S. PATENT DOCUMENTS

| | | | |
|---|---|---|---|
| 4,583,187 | 4/1986 | Stoub | 250/252.1 R X |
| 4,680,723 | 7/1987 | Whinray et al. | 250/332 X |
| 4,876,453 | 10/1989 | Wirick | 250/252.1 A X |
| 4,948,964 | 8/1990 | Gohlke | 250/252.1 A X |
| 5,101,271 | 3/1992 | Andrews et al. | 250/252.1 A X |
| 5,245,425 | 9/1993 | Klatt | 250/252.1 A X |
| 5,302,824 | 4/1994 | Prager | 250/252.1 A |
| 5,323,002 | 6/1994 | Sampsell et al. | 250/252.1 A |
| 5,371,358 | 12/1994 | Chang et al. | 250/252.1 A X |
| 5,416,711 | 5/1995 | Gran et al. | 364/436 |
| 5,420,421 | 5/1995 | Lindgren et al. | 250/252.1 |

FOREIGN PATENT DOCUMENTS

| | | | |
|---|---|---|---|
| 2500434 | 7/1975 | Germany | 250/252.1 |
| 71919 | 4/1985 | Japan | 250/252.1 A |
| 30720 | 2/1988 | Japan | 250/252.1 |
| 2089993 | 6/1982 | United Kingdom | 250/252.1 A |

OTHER PUBLICATIONS

"System design for a staring mosaic sensor" *SPIE* vol. 226 Infrared Imaging Systems Technology (pub. 1980) pp. 53–60 by Herbert E. Rauch et al., in 250/332.

*Primary Examiner*—Thomas P. Noland
*Attorney, Agent, or Firm*—Michael W. Sales; Wanda K. Denson-Low

[57] ABSTRACT

A calibration circuit (40) for infrared detectors including a first circuit (72) for storing a value representing the level of a first output of each detector in response to the illumination of the detector by a first target. A second circuit (74) stores a value representing the responsivity of each detector in response to the illumination of the detector by the first target. A third circuit (48), responsive to the first circuit (72), adjusts the level of the output of each detector in response to a second target and provides a level adjusted signal in response thereto. A fourth circuit (52), responsive to the second circuit (74), adjusts the responsivity of each detector in response to the second target and provides a responsivity adjusted signal in response thereto. A fifth circuit (58, 60, 62) feeds the output of the third circuit (48) back to the first circuit. (72). Finally, a sixth circuit (58, 60, 62) feeds the output of the fourth circuit (52) back to the second circuit (74). The invention performs level and responsivity equalization processing on the analog output of an Infrared Focal Plane Array (IRFPA), when in imaging mode and calculates the digital data for performing the equalization, when in calibration mode. Novel features of the invention include the use of close loop feedback in the calibration mode, the following ways: 1) The processed output is used to incrementally improve the digital level equalization (LE) or responsivity equalization (RE) value for each pixel. 2) The convergence target of the closed loop algorithm is programmable to any analog to digital converter (ADC) output code. 3) Data analysis of entire image frames of the processed ADC output is used set the value of the convergence target at each step of calibration (a secondary term of feedback). 4) Saturation logic guarantees stability of the loop and facilitates the detection of dead pixels.

12 Claims, 5 Drawing Sheets

APPARATUS AND METHODS OF CLOSED LOOP CALIBRATION OF INFRARED FOCAL PLANE ARRAYS

BACKGROUND OF THE INVENTION

1. Field of the Invention

The present invention relates to the design and manufacture of imaging systems. More specifically, the present invention relates to the design and manufacture of staring infrared sensor arrays.

2. Description of the Related Art

Current staring infrared sensors have up to 640 times the number of pixels as prior designs. The higher number of pixels present a data processing problem during the limited period of time available to perform a calibration of the sensor array. The problem arises from a need to calibrate stating sensors at the same rate as scanning sensors are calibrated in order to minimize a redesign of existing equipment originally designed for scanning sensors.

Conventional approaches use a microprocessor and perform a calibration based on some assumptions as to how the analog circuitry of the sensor is configured. Typically, the microprocessor uses successive approximations and makes evaluations to determine if adequate calibrations are achieved.

These approaches are typically slow and require information about the structure of the analog circuitry that is used for the calibration. In addition, these approaches typically required many batches of data in order to remove noise adequately.

Hence, there has been a need in the art for an improved system and technique for calibrating staring infrared sensors at high speed without requiring information about the system being calibrated or the system being used to perform the calibration.

SUMMARY OF THE INVENTION

The need in the art is addressed by the present invention which performs level and responsivity equalization processing on the analog output of an Infrared Focal Plane Array (IRFPA), when in imaging mode and calculates the digital data for performing the equalization, when in calibration mode. The invention is adapted for use with a stating imaging sensor having an array of detectors. In a most general sense, the invention includes a first circuit for storing a value representing the level of a first output of each detector in response to the illumination of the detector by a first target. A second circuit stores a value representing the responsivity of each detector in response to the illumination of the detector by the first target. A third circuit, responsive to the first circuit, adjusts the level of the output of each detector in response to a second target and provides a level adjusted signal in response thereto. A fourth circuit, responsive to the second circuit, adjusts the responsivity of each detector in response to the second target and provides a responsivity adjusted signal in response thereto. A fifth circuit feeds the output of the third circuit back to the first circuit. Finally, a sixth circuit feeds the output of the fourth circuit back to the second circuit.

Novel features of the invention include the use of close loop feedback in the calibration mode, in the following ways:

1) The multiplexed, equalized and digitized IRFPA analog output is used to incrementally improve the digital level equalization (LE) or responsivity equalization (RE) value for each pixel.

2) The convergence target of the closed loop algorithm is programmable to any analog to digital converter (ADC) output code.

3) Data analysis of entire image frames of the processed ADC output is used set the value of the convergence target at each step of calibration (a secondary form of feedback).

4) Saturation logic guarantees stability of the calibration loop and facilitates the detection of dead pixels.

The closed loop algorithm, implemented in digital circuitry, complements the analog correction circuitry (used for actually applying the equalization correction) by automatically compensating for gain scaling, level equalization scaling, responsivity equalization scaling, offsets at all gain stages, and ADC input offsets in the analog circuitry. The closed loop algorithm compensates for nonlinearity at the responsivity equalization input to the analog multiplier and inherently filters noise out of the ADC output used to calculate the level equalization and responsivity equalization data. The programmable convergence target and data analysis feedback circuits of the invention permit optimization of amplitude and detection of faulty pixels during calibration. Calibration can be performed at speeds faster than attainable with a microprocessor and can place results of computation directly in the memory used as storage during imaging.

DESCRIPTION OF THE INVENTION

Illustrative embodiments and exemplary applications will now be described with reference to the accompanying drawings to disclose the advantageous teachings of the present invention.

While the present invention is described herein with reference to specific embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
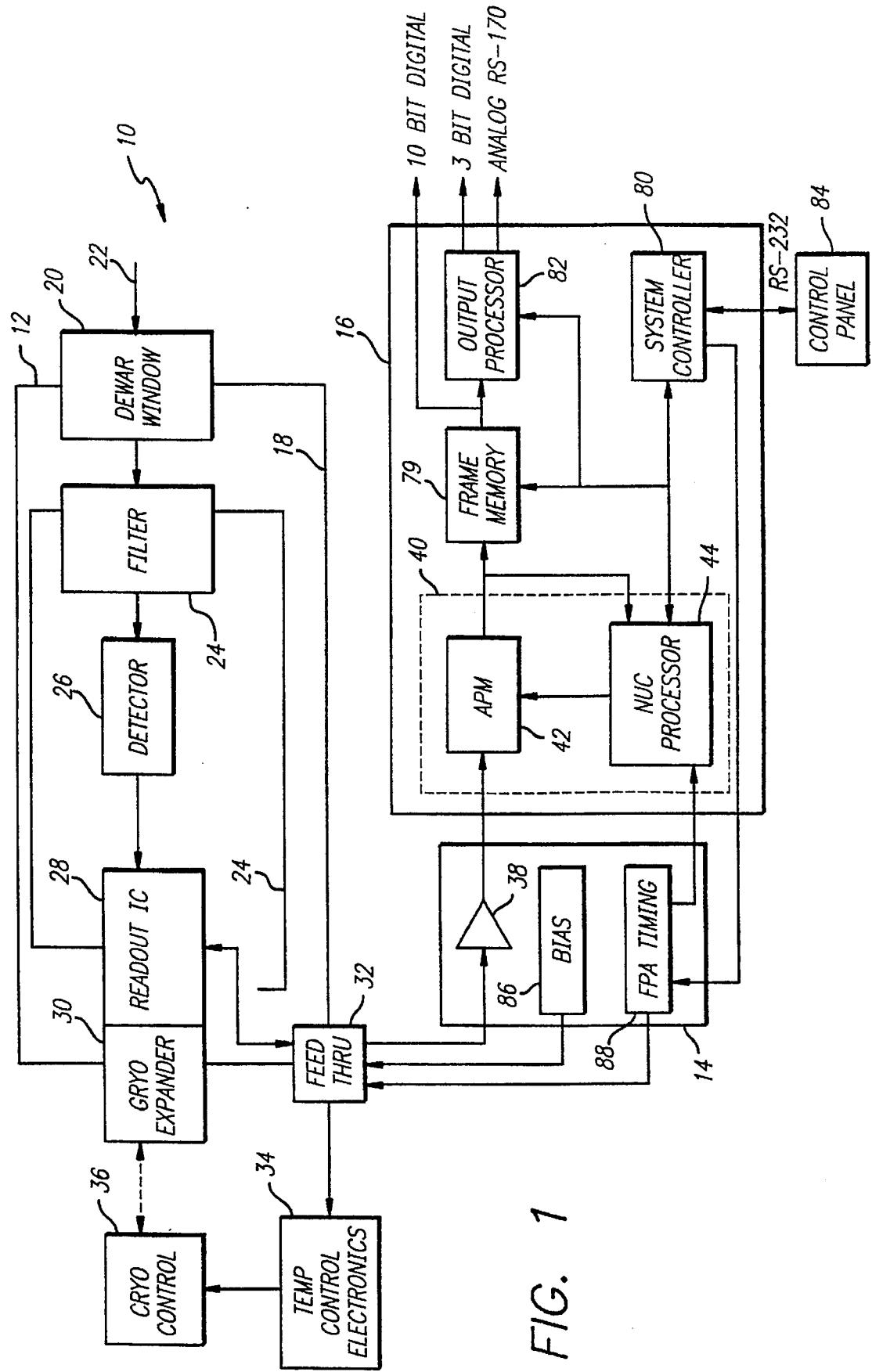
FIG. 1 is a block diagram of the key functional blocks of an imaging sensor constructed in accordance with the teachings of the present invention.

FIG. 1 is a block diagram of the key functional blocks of an imaging sensor constructed in accordance with the teachings of the present invention. The system 10 includes a focal plane array (FPA) 12, an FPA interface unit 14 and a signal processing unit 16. The focal plane array includes a dewar 18 which has a dewar window 20. Incident electromagnetic energy 22 is filtered by a filter 24 an input to a detector 26 mounted within a coldshield 27. In the preferred embodiment, the focal plane array is implemented in accordance with the teachings of U.S. patent application Ser. No. 08/491,133, filed Jun. 16, 1995, by M. W. Pines, et al., entitled MULTISPECTRAL STARING SENSOR, (Atty. Docket No. PD 95194), the teachings of which are incorporated herein by reference.

The output of the detector 26 is input to a readout integrated circuit (IC) 28 mounted on a cryo-expander 30. The output of the readout IC 28 is input to a feedthrough circuit 32 which feeds the signal to a temperature control electronics unit 34. The temperature control electronics unit 34 controls the cryo-compressor 36 which in turn passes compressed gas to the cryo-expander 30. Hence, the temperature control electronics unit 34 actively controls the temperature of the focal plane array 12 by controlling the power to the compressor 36.

The feedthrough circuit 32 provides a signal to the FPA interface unit 14 which is amplified by an amplifier 38 and input to the signal processing unit 16. Bias and timing for the FPA 12 are provided by a bias circuit 42 and a timing circuit 44, respectively, of the FPA interface unit 14 under control of a system controller 80 in the signal processing unit 16.

In addition, the FPA interface unit 14 provides buffered, differential video drivers for analog outputs to allow operation remotely from the signal processing unit 16.

The signal processing unit (SPU) 16 contains the power, control and video processing functions for the system 10. One of the key modules of the signal processing unit 16 is the closed loop calibration system 40 of the present invention.

Figure 2:
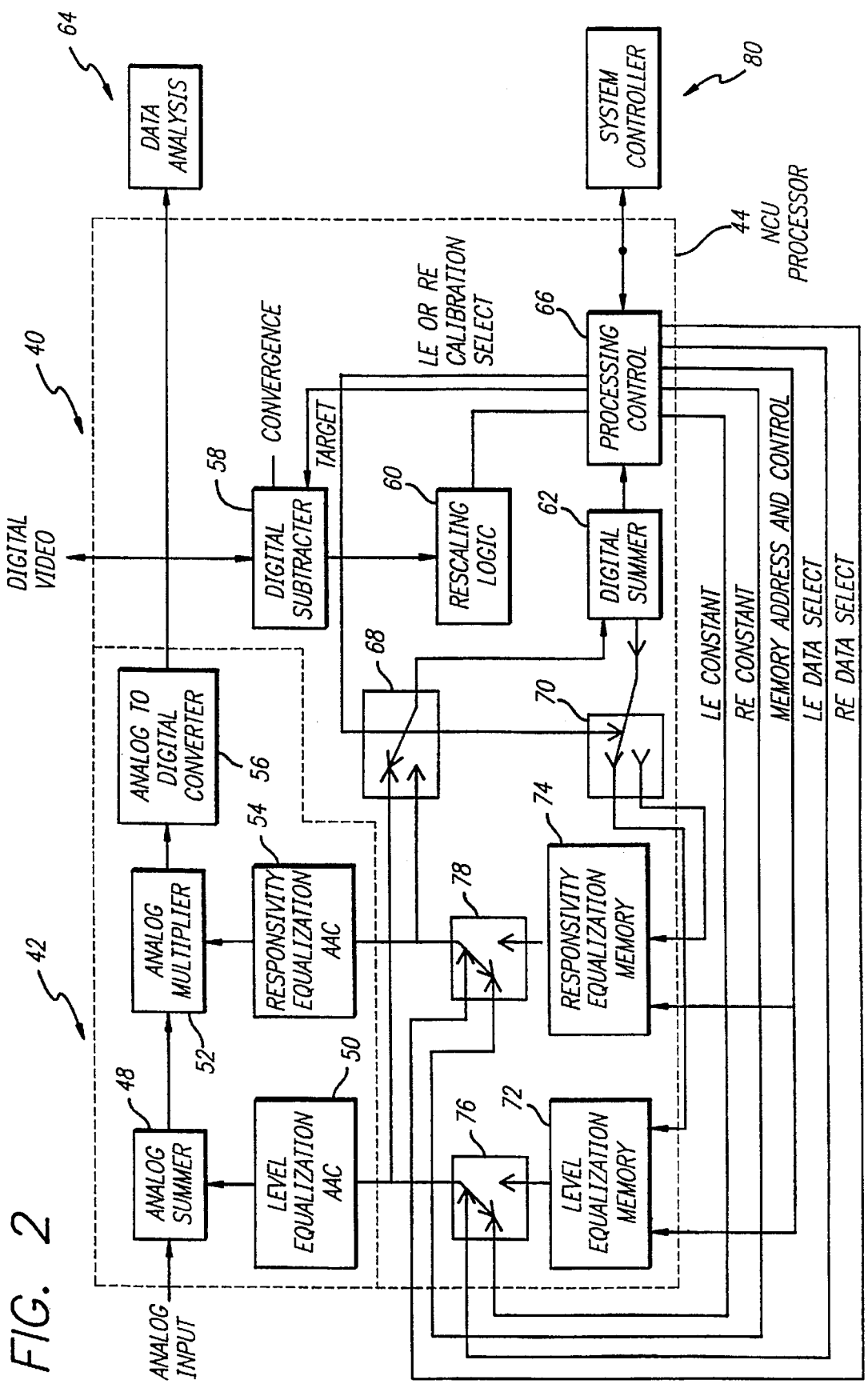
FIG. 2 is a block diagram of the closed loop calibration system of the present invention.

FIG. 2 is a block diagram of the closed loop calibration system. The system 40 includes an analog processing module (APM) 42, a nonuniformity correction (NUC) processor 44, the data analysis function of the output processor 82, and the mode select, programmable convergence target select, and filter constant select software functions of the system controller 80.

The APM 42 includes an analog summer 48, a level equalization (LE) digital to analog converter (DAC) 50, an analog multiplier 52, a responsivity equalization (RE) digital to analog converter 54 and an analog to digital converter 56. These elements are used both in imaging and calibration to apply level equalization and responsivity equalization to the output of the FPA 12. The analog summer 48 sums the output of the FPA 12 with the negative of the output of the level equalization DAC 50. The analog multiplier 52 accepts and performs gain control of the output of the analog summer with the output of the responsivity equalization DAC 54. The multiplier 52 uses the output of the responsivity equalization DAC 54 to vary the gain, applied to the output of the summer as referenced to its zero input. The output of the multiplier 52 is digitized by the analog to digital converter 56.

In short, the APM 42 multiplexes the video into a single stream, compensates for detector-to-detector non-uniformity's in real time, and digitizes the input video. Removal of the non-uniformity's in the analog domain insures that the analog to digital conversions can be optimized to obtain the maximum resolution for the specified maximum temperature range The output of the APM 42 is fed back to the nonuniformity corrector 44.

The NUC 44 maintains the detector correction coefficients during operation and performs the coefficient update during field or laboratory calibration modes. The NUC 44 includes a digital subtractor 58, rescaling logic 60, a digital summer 62, a processing control circuit 66, a level equalization memory 72, a responsivity equalization memory 74 and first, second, third and fourth switches 68, 70, 76 and 78, respectively. These digital elements perform two main functions:

1) storing the level equalization and responsivity equalization data, and supplying this data to the level equalization DAC 50 and responsivity equalization DAC 54 during imaging and calibration and 2) performing the closed loop calibration algorithm during calibration in accordance with the teachings of the present invention.

The level equalization memory 72 and responsivity equalization memory 74 store the level equalization and responsivity equalization data respectively. The memories 72 and 74 contain one level equalization or responsivity equalization data word for each pixel in the FPA image. The memories 72 and 74 can be read or written at a rate equal to the data rate of the FPA output after multiplexing of parallel channels at the pixel rate.

The memories 72 and 74 are controlled by the processing control circuit 66 which generates the address and control inputs to each memory to permit sequential reading of the contents thereof during imaging and reading from and writing to the memory during calibration. The processing control circuit 66 also controls whether the memory contents or a constant value or its own output is supplied to the level equalization DAC 50 (via control of the third switch 76) and responsivity equalization DAC 54 (via control of the third switch 78).

The processing control circuit 66, also controls the remaining digital circuitry via the first, second, third and fourth switches 68, 70, 76 and 78 to select imaging mode or calibration mode or for performing the closed loop calibration.

The rescaling logic uses a multiplier feedback factor from the processing control circuit 66 to restate the feedback signal. By selective control of the switches, the processing control circuit 66 allows the digital summer 62 to add the signed output of the rescaling logic 60 to the corresponding level equalization data or responsivity equalization data from the corresponding memory, that is, the level equalization data or responsivity equalization data for the analog input that ultimately resulted in the current reseated digital error.

In addition to being a signed adder, the digital summer 62 contains saturation logic which causes the summer to output the maximum or minimum value when the summer arithmetic result is greater than the maximum value or less than the minimum value, respectively (for instance, if inputs are "maximum value" and a positive number, the output is still the maximum value, and if inputs are "minimum value" and a negative number, the output is still the minimum value).

When the apparatus is in level equalization (LE) or responsivity equalization (RE) calibration mode, the output of the digital summer 62 is written back to the level equalization data memory or responsivity equalization data memory, respectively.

The output of the ADC 56 is input to a separate processor (or the optional output processor 82 of FIG. 1 as discussed below) for data analysis processing (at 64) as described herein. The output of the process control circuit 66 is input to the system controller 80 of FIG. 1.

Returning to FIG. 1, additional features of the signal processing unit 16 include a frame memory 79, the system controller 80, an output processor 82, and a control panel 84. The frame memory 79 stores a complete frame of video; allows for inversion or reversion, freeze frame, multiple sensor frame rates, and recursive scene averaging.

The output of the frame memory 79 is input to the output processor 82 The output processor 82 converts the digitized and corrected video back to an analog RS-170 format; optimizes the video signal to the display through the use of logarithmic histogram equalization, local area contrast enhancement, a two-dimensional reconstruction filter and electronic zoom.

The system controller 80 receives input from the control panel 84 and regulates the operation of the APM 42, NUC processor 44, frame memory 79 and output processor 82. The system controller 80 also controls all sensor functions, applies control parameters to the NUC processor 44 to select imaging or calibration modes and their respective control parameters, and provides permanent storage for NUC coefficients.

In the illustrative implementation, the control panel 84 includes a ruggedized touch screen which provides virtual switches and enunciators for all modes and user functions. The control panel 84 allows for the development and optimization of the user interface.

THEORY OF OPERATION AND METHODS OF APPLICATION OF THE CLOSED LOOP CALIBRATION APPARATUS

In operation, the system 10 is first calibrated. In general, calibrations are based on two photon flux levels in the spectral band of interest, which correspond to two temperatures of a black body. Since the detectors are quite linear with flux, a calibration using only a gain and level adjustment (as is the general practice) is appropriate. Hence, the calibration is performed by adjusting all the detector voltage outputs at one reference flux level (temperature) to 0 volts, and adjusting the detector voltage outputs at a second temperature to the maximum amplitude possible.

Figure 3:
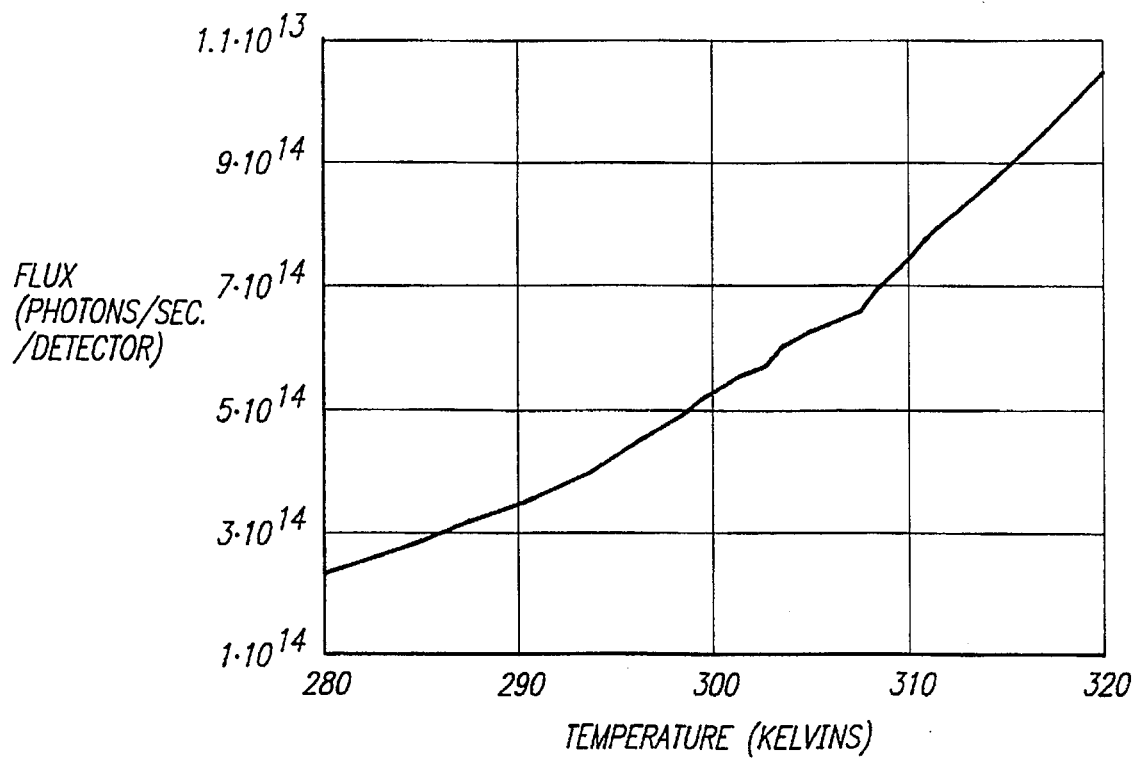
FIG. 3 is a graph which depicts the nonlinear relationship between flux and temperature in the 3–5 micron wavelength band.

FIG. 3 is a graph which depicts the nonlinear relationship between flux and temperature in the 3–5 micron wavelength band. As depicted in FIG. 3, because of the nonlinear relationship between flux and temperature, the voltage output of the detectors is nonlinear with temperature. However, since the nonlinearity is the same for all detectors, it can be ignored for imaging purposes as we are more concerned with showing maximum visual contrast in the picture than showing a strictly radiometric output.

FIGS. 4-8 summarize the strategy for applying equalization.

Figure 4:
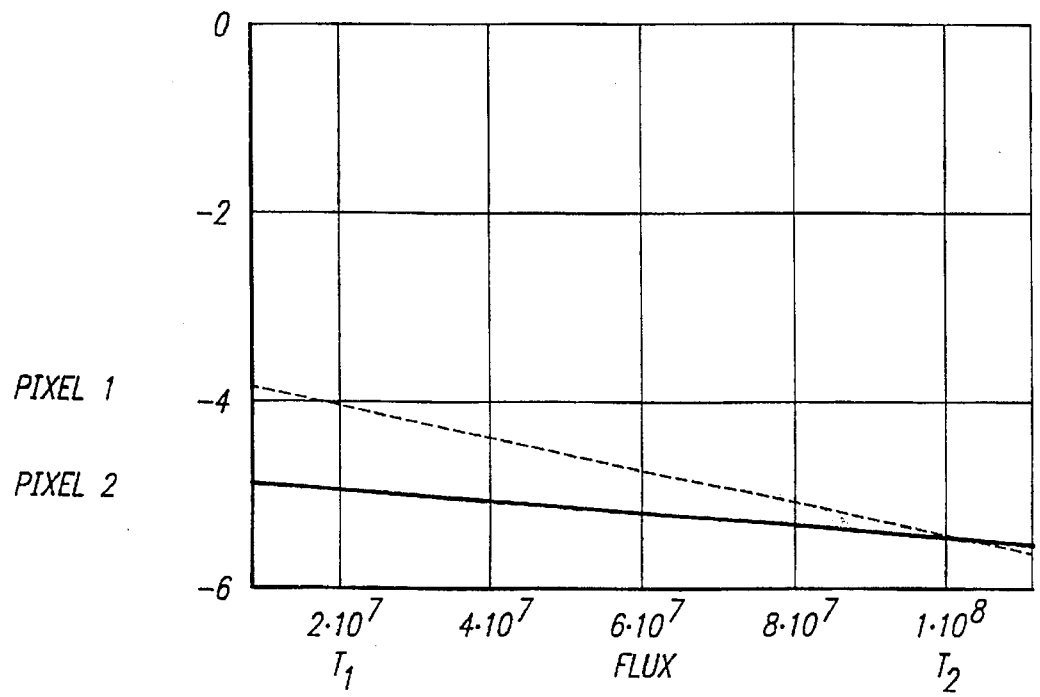
FIG. 4 shows the response of two pixels before equalization.

FIG. 4 shows the response of two pixels before equalization. Pixel 1 is the maximum responsivity pixel for all the pixels in the image. Pixel 2 is the minimum responsivity pixel for all the pixels in the image. Note that, in this example, the voltage gets more negative for increasing flux.

Figure 5:
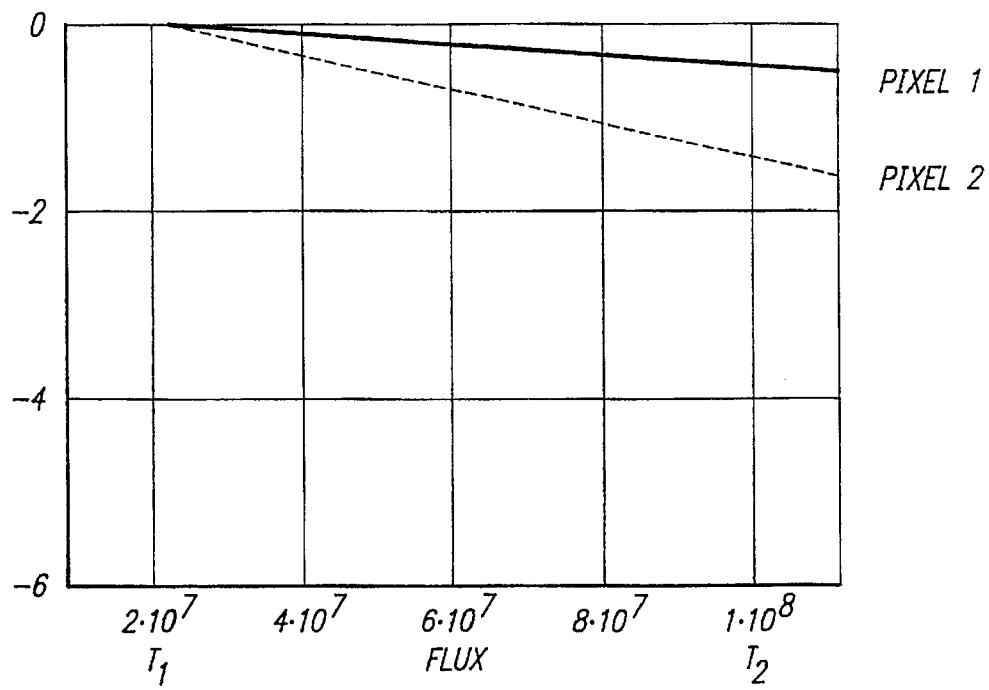
FIG. 5 depicts maximum and minimum pixel responses at the input to the multiplier after level equalization.

FIG. 5 depicts maximum and minimum pixel responses at the input to the multiplier after level equalization. After level equalization (LE), the raw outputs have been adjusted to set the offsets of all of the pixels in the image to 0 volts at the input to the analog multiplier when the FPA 12 is illuminated by a black body at reference temperature $T_1$. In calibration mode, the circuit 40 first determines the analog to digital converter (ADC) output code which corresponds to a 0 volts input to the analog multiplier 52, and sets the programmable convergence target to that value.

Note that the LE programmable convergence target must be set to correct all the pixels to 0 volts to build a basis for performing the RE calibration. This is because the RE correction must equalize the changes in voltage in response to a change in photon flux. By making the starting point of the voltage change 0 volts, the LE correction will not be affected by the subsequent RE correction, and the ADC codes of the pixels measured at the second temperature can be used directly as the voltage changes for the purpose of RE calibration. This permits the use of a programmable convergence target for the RE calibration.

More precisely, the "0 volt input" to the analog multiplier 52, referred to in the previous paragraph, is the input voltage whose corresponding analog multiplier output does not change when the responsivity equalization (RE) input to the multiplier changes from its maximum value to it minimum value, and effectively is the "computational zero" of the multiplier. This actual voltage of this input signal may be different than 0 volts due to input offsets of the multiplier circuit. The ADC code of the analog multiplier's corresponding output must be found because there may also be output offsets in the multiplier and in any other buffer circuitry between the multiplier and the ADC, and consequently may not be the code nominally associated with 0 volts (the ideal output of the analog multiplier). This ADC code must be used as the programmable convergence target for the LE calibration, in order to provide an accurate basis for the RE calibration, by insuring that all voltage changes from the LE corrected temperature are proportionally scaled by the RE.

The ADC code for the LE programmable convergence target (corresponding to the computational zero of the analog multiplier) is found by applying a constant analog signal input (such as ground) and a constant LE value to the analog summer 48, varying the RE input to the analog multiplier 52 from its minimum to maximum values and measuring the change in the ADC codes using the data analysis circuit 64. The LE value is then adjusted to try to minimize this change. This adjustment can be by sequentially trying all the LE values, performing a binary search among the LE values, or performing an iterative calculation on the LE to improve it. In the illustrative implementation, the following iterative calculation was used at each constant LE setting:

$$LE(t+1) = LE(t) + \frac{ADC\ CODE_{at\ RE\ maximum} - ADC\ CODE_{at\ RE\ minimum}}{2^N} \quad [1]$$

The system controller 80 iterates equation [1] and supplies an updated constant LE value to the processing control circuit 66. Note that this equation assumes that LE is subtracted from the FPA input, and hence the $$\frac{ADC\ CODE_{at\ RE\ maximum} - ADC\ CODE_{at\ RE\ minimum}}{2^N}$$

error term is added to produce negative feedback. When the error term $ADC\ CODE_{at\ RE\ maximum} - ADC\ CODE_{at\ RE\ minimum}$ approaches zero, and $ADC\ CODEa_{at\ RE\ maximum}$ converges to within a specified number of bits, the system controller 80 saves the $ADC\ CODE_{at\ RE\ maximum}$ as the programmable convergence target supplied to the processing control circuit 66 for the LE calibration.

Figure 6:
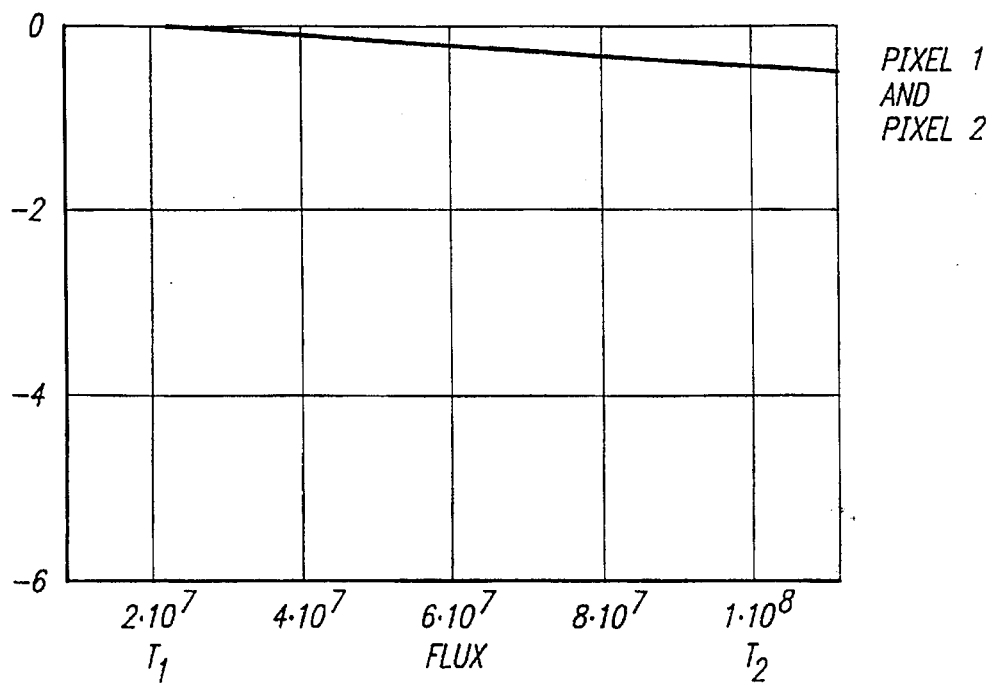
FIG. 6 depicts maximum and minimum pixel responses at the input to the analog to digital converter of the analog processing module of the closed loop calibration system of the present invention.

FIG. 6 depicts maximum and minimum pixel responses at the input to the analog to digital converter 56 of the analog processing module 42 of the closed loop calibration system of the present invention. After level equalization and responsivity equalization, then pixel outputs have been adjusted to set the responses of all of the pixels in the image to that of the minimum responsivity pixel, Pixel 2, at the input to the analog to digital converter 56 when the FPA 12 is illuminated by a black body at reference temperature $T_2$. The minimum responsivity pixel output, with the maximum gain RE value applied to it, determines the maximum equalized output amplitude attainable. Thus, the output of all pixels will be equalized to this value by the closed loop mechanisms, by programming the programmable convergence target to the ADC code corresponding to the output of the minimum responsivity pixel with maximum gain RE correction applied to it. All pixels in the image should have responses like that shown in FIG. 6, when monitored at the ADC 56.

Description of Closed Loop Calibration Hardware

Analog Circuitry.

The analog circuitry of the invention (48, 50, 52, 54, 56) ideally performs the following analog operation on the multiplexed output of the focal plane array (FPA):

$$Va_i=[(Vf_i-VLE \cdot LE_i) \cdot (VRE \cdot RE_i)] \quad [2]$$

where:

$Va_i$=equalized image input to APM A/D converter for pixel i, $Vf_i$=FPA image output for pixel i, VLE=full scale level before gain correction voltage of APM, VRE=full scale gain correction voltage of APM, $LE_i$=level equalized value for pixel i between −1 and 1, $RE_i$=responsivity equalized value for pixel i between, $$\frac{1}{RR} \text{ and } 1 \text{ or } -\frac{1}{RR} \text{ and } -1$$

RR=responsivity ratio between most responsive and least responsive pixel of IR FPA.

The constants $LE_i$, and $RE_i$ are supplied by the LE and RE memories (72, 74) using the unsigned coding and scaling. It is the task of the digital calibration circuitry calculate these constants.

It must be noted in passing that the ideal function shown above must be altered slightly to allow for imprecision of an actual implementation.

$$Va_i=[(Vf_i-VLE \cdot LE_i+k_1) \cdot (VRE \cdot RE_i \cdot k_2+k_3)+k_4+k_5] \quad [3]$$

where:

$k_1$=input offsets in LE summer and RE multiplier signal input, $k_2$=scaling factor error in RE multiplier, $k_3$=input offset in RE multiplier gain control input, $k_4$=output offset in RE multiplier, $k_5$=parabolic and odd order nonlinearities of the RE multiplier, and The parameters $k_1$, $k_2$, $k_3$ and $k_4$ and are assumed constant and independent of signal level, whereas the nonlinearities in $k_5$ are a function of signal level to a degree indicated by the specifications of the analog multiplier used, and are much more strongly dependent on the gain control input of a variable transconductance (Gilbert) multiplier than on the signal input. Because it is assumed that the image data will use the more linear signal input of the multiplier and the RE correction voltage will use the gain control input, the non-linear errors will tend to remain constant once fixed RE correction coefficients are used. Thus, the principal analog circuit errors that must be corrected when calculating the NUC coefficients are the scaling factor error ($k_2$) and the various constant offset errors from both linear and nonlinear sources ($k_1$, $k_3$, $k_4$, $k_5$).

Calibration, the process of calculating the NUC coefficients, is intended to correct certain errors in the analog circuitry as well as the level and responsivity errors of the FPA. Because the analog circuitry is not perfectly calibrated, it is desirable to use a closed loop algorithm to calculate the NUC coefficients since the accuracy of the coefficients is limited only by the resolution of the LE and RE voltages, rather than on their absolute accuracy.

Digital Calibration Circuitry.

The digital calibration circuitry of the invention (58, 60, 62, 66, 68, 70, 72, 74, 76, 78) used for the closed loop calibration implements the following iterative computation:

$$M_i(t+1) = M_i(t) \text{ maximum value} \quad [4]$$
$$\text{if } M_i(t) + FC \cdot (ADC_i - PCT) > M_i(t) \text{ maximum value}$$

$$M_i(t+1) = M_i(t) \text{ minimum value}$$
$$\text{if } M_i(t) + FC \cdot (ADC_i - PCT) < M_i(t) \text{ minimum value}$$

$$M_i(t+1) = M_i(t) + FC \cdot (ADC_i - PCT)$$
$$\text{if } M_i(t) + FC \cdot (ADC_i - PCT) \leq M_i(t) \text{ maximum value and}$$
$$M_i(t) + FC \cdot (ADC_i - PCT) \geq M_i(t) \text{ minimum value}$$

where $M_i(t)$=entry in LE or RE NUC coefficient memory corresponding to pixel i in current frame, $M_i(t+1)$=entry in LE or RE NUC coefficient memory corresponding to pixel i in next frame, $ADC_i$=current value of pixel i from analog to digital converter, PCT=programmable convergence target of same range of values as ADC, FC=filter constant between:

±(maximum LE or RE memory value)/maximum ADC value.

In the closed loop algorithm, the trial input $M_i(t)$ from the LE memory 72 or RE memory 74 is applied to the LE DAC 50 or RE DAC 54 inputs, respectively, with all other inputs set at predetermined values. The resulting $ADC_i$ output from the ADC 56 is used in the error term $FC \cdot (ADC_i-PCT)$ to produce a refined LE memory or RE memory value $M_i(t+1)$. The algorithm converges to a final result for $M_i(t)$ when the error term approaches zero and $ADC_i$ approaches PCT. The algorithm converges if there is negative feedback and is stable, that is, if the filter constant FC is of the correct sign and a small enough magnitude to filter out the noise present.

The computation in equation 3 has saturation logic as is indicated by the conditional nature of the result $M_i(t+1)$. Saturation logic is used to make the feedback loop more stable when the LE or RE data is at or near their maximum or minimum values during calibration, and to permit the detection of dead, low responsivity or uncorrectable pixels as a byproduct of calibration. Saturation Logic is a special characteristic of the digital summer 62 which causes the summer to output the maximum or minimum value (based on the number bits of the output) when the summer arithmetic result is greater than the maximum value or less than the minimum value, respectively. This stabilizes the feedback loop by preventing the truncated arithmetic from causing LE or RE data results to wrap around from the maximum to minimum values or from minimum to maximum values.

For correctable pixels, saturation logic allows the extreme LE and RE values to be used reliably and thus allows for tighter optimization of the scaling of the LE and RE dynamic ranges, allowing for more resolution for a given number of bits of LE or RE.

For dead, very unresponsive, or uncorrectable pixels, saturation logic permits the feedback loop to arrive at a single value for such pixels and provides the means of identifying these faulty pixels as a byproduct of calibration. Because uncorrectable pixels always have an error of the same sign added to their LE or RE values, if there were no saturation logic, the arithmetic would continuously wrap around, resulting in random LE and RE values for these pixels. The saturation logic and the operation of the feedback loop causes uncorrectable pixels to have a minimum or maximum RE (or LE) value. Dead or excessively unresponsive pixels will have the maximum gain RE code and overly responsive but uncorrectable pixels will have the minimum gain RE code. By detecting these codes, these pixels can be identified for substitution in the image output or other special processing. The operation of the saturation logic is particularly effective when combined with the data analysis techniques described above because the data analysis technique takes into account correctable and uncorrectable pixels when setting the programmable convergence target for the RE calibration.

The overall recursive calculation of the entire calibration circuit is obtained by substituting equation [2] into equation [4].

$$M_i(t+1)=M_i(t)+FC \cdot ([VF_i(t)-VLE \cdot LE_i(t)) \cdot VRE \cdot RE_i(t)]-PCT) \quad [5]$$

For a coding that makes the full scale unsigned LE correspond to the largest magnitude being subtracted, to produce negative feedback, the arithmetic computation for LE calibration must be.

$$LE_i(t+1)=LE_i(t)+FC \cdot ([(Vf_i(t)-VLE \cdot LE_i(t)) \cdot VRE \cdot RE_i(t)]-PCT) \quad [6]$$

For RE calibration, the situation is slightly more complicated. For a coding that makes the full scale unsigned RE correspond to the largest gain being applied, the sign of the FC applied to the error depends on whether the RE calibration temperature is greater of lesser than the LE calibration temperature and whether the FPA readout goes more positive or more negative with increasing temperature. Hence, the system controller must be able to modify the sign of the filter constant FC appropriately depending on these circumstances.

$$RE_i(t+1)=RE_i(t)+FC \cdot ([(Vf_i(t)-VLE \cdot LE_i(t)) \cdot VRE \cdot RE_i(t)]-PCT \quad [7]$$

Data Analysis Digital Circuitry.

The data analysis circuitry of the invention (64) was originally implemented in the illustrative implementation as a part of the Output Processor 82. Data analysis, as it is used here, is simply a way of finding the number of pixels that lie in a given range of ADC codes. The purpose of the digital analysis circuitry is to provide the information to the system controller 1) to provide a convergence criteria for calibration and 2) to optimize the convergence targets for LE and RE calibration.

In the illustrative implementation, a histogram with bins 4 ADC codes wide is used. To generate a histogram, the circuit is implemented with a memory that has an entry for each ADC code (or block of ADC codes) and an entry width that is enough to hold a count equal to the number of pixels in the entire image (480×640=307200 for the illustrative implementation). The circuit must also have a digital adder that can be used to increment the values in the memory. Additional control circuitry is needed to initially set the memory to 0, to enable the acquisition of histograms during active video periods, and to allow the system controller 80 to access the acquired histograms. When a histogram must be acquired, the memory must be initially set to 0. Then as each ADC code of each pixel arrives to the circuit, the appropriate entry for that code is read from the memory, incremented, and written back to the memory. At the end of the active video period, the histogram can be retrieved be the processing control circuits. The system controller 80 will read the entire contents of the memory before allowing another histogram to be acquired. Hence this data analysis circuit processes the entire frame of ADC outputs and for the histogram case, counts the number of occurrences of all ADC codes.

A simple alternative could be a digital range comparator which counts the number of pixels in a programmable range of ADC codes. This circuit would consist of two digital magnitude comparators, one for the upper ADC code threshold, and another for the lower ADC threshold. Each of these would have thresholds that can be programmed by the system controller. This circuit would have a counter wide enough to hold a count equal to the number of pixels in the entire image, which can be initially set to 0. Additional control circuitry to enable the counter during active video periods, and to allow the system controller 80 to access the count. When an in-range count must be acquired, the counter is initially set to 0. Then as each ADC code of each pixel arrives to the circuit, the code is compared with the upper and lower ADC threshold, and if it is between them, the counter is incremented. At the end of the active video period, the system controller 80 reads the counter value before allowing another count to be acquired. Hence this data analysis circuit processes the entire frame of ADC outputs and counts the number of occurrences of all ADC codes in the programmed range.

One of the uses of the data analysis hardware in LE and RE calibration is as a convergence criteria. Once the feedback loop hardware has been configured from calibration by programming its programmable convergence target and filter constant, the calibration is allowed to proceed, with the data analysis circuit 64 monitoring the ADC output. The data analysis circuit 64 provides a histogram or in-range count output to the system controller 80 that can be used to determine if the feedback loop has converged for a sufficiently high number of pixels in the image and that they each have converged to a reasonable accuracy. Data analysis, as it is used here, is most simply a way of finding the number of pixels that lie in a given range of ADC codes. In the illustrative implementation, a histogram with bins 4 ADC codes wide was used. The simplest possible circuit could be a range comparator which counts the number of pixels in a given range of ADC output codes. Assume for the sake of discussion that a histogram is used.

Using a histogram for data analysis, the processing control circuit 66 uses the standard deviation of the histogram as a criteria for convergence. The processing control circuit 66 monitors the standard deviation and verifies that it has dropped below a spatial noise specification to ensure that convergence has been achieved for a sufficiently large percentage of the pixels. Additionally, the range of histogram bins used to compute the standard deviation may be limited by the operator or by the software algorithm to optimize the algorithm by excluding dead, low responsivity, or uncorrectable pixels. Still another technique is to configure the data analysis circuit to acquire the histogram using only a portion of the entire image as directed by the operator or by the software algorithm. To make a determination that the process has progressed to completion, the processing control circuit 66 monitors the standard deviation to determine if it still decreasing, and to terminate the calibration when it is not. In the alternative, the processing control circuit 66 can combine the standard deviations of multiple frames of data to obtain a long term standard deviation (combining both spatial and temporal data) and terminate the calibration if a particular frame's data drops below that value.

In the previous discussion, it was assumed that all pixels are responsive and that the RE subsystem was capable of equalizing the minimum and maximum responsivity pixels. If some pixels have negligible response or some pixels cannot be corrected by the range available to the RE system, then some pixels must be considered "dead" or "uncorrectable" and not used in the criteria for setting the programmable convergence target for the RE calibration. It is this case where data analysis is most useful. Without the use of data analysis, that is, with predetermined convergence targets for the LE and RE calibration, either the maximum number of pixels cannot be corrected or the analog circuitry must be configured so that the maximum output amplitude may not be obtained for any particular IRFPA.

Before performing the RE calibration, it must be determined what range of pixels is correctable. Using the data analysis circuit 64, a histogram of the ADC codes for the pixels is acquired for the maximum gain RE setting, and a histogram is acquired for the minimum gain RE setting. Using the histograms, a programmable convergence target, corresponding to one of the histogram bins, will be found that allows the maximum number of pixels to be corrected. A decision is made which range of bins must be accepted, with pixels in outlying bins to be considered dead or uncorrectable. The decision is made by the following procedure.

The maximum gain RE histogram is examined from the low responsivity end to the high responsivity end (note that the maximum and minimum histograms may be examined either from their extreme highest or lowest bin, or between an operator directed or software programmed range of bins, such as, in the case of the maximum gain histogram, using some minimum responsivity criteria used to establish the starting bin). At the same time the minimum RE histogram is examined from the high responsivity end to the low responsivity end. Starting from each end of the histogram, the populations of the bins of both histograms are examined, and it is determined pixels in that bin are to be retained. The following decision is made each step. The population in the current minimum gain histogram is examined. If this bin's population plus the sum of the populations of the discarded bins of the minimum gain histogram is less than the sum of the populations of the discarded bins of the maximum gain histogram, then the bin under consideration is discarded, its population added to the sum of the populations of the discarded bins of the minimum gain histogram, and the decision process continues on to the next minimum gain histogram bin. Otherwise, the current maximum gain histogram bin is considered next.

The population in the current maximum gain histogram bin is examined. If this bin's population plus the sum of the populations of the discarded bins of the maximum gain histogram, is less than the sum of the populations of the discarded bins of the minimum gain histogram, then the bin under consideration is discarded, its population added to the sum of the populations of the discarded bins of the maximum gain histogram, and the decision process continues on to the next maximum gain histogram bin. Otherwise, the current minimum gain histogram bin is considered next. The considerations of bins of the two histograms continues in this fashion, perhaps switching back and forth between the two histograms as has been described, until the same bin is being considered for both histograms. The ADC code corresponding to this bin is the optimal programmable convergence target for the RE calibration resulting in the maximum number of corrected pixels.

Figure 7:
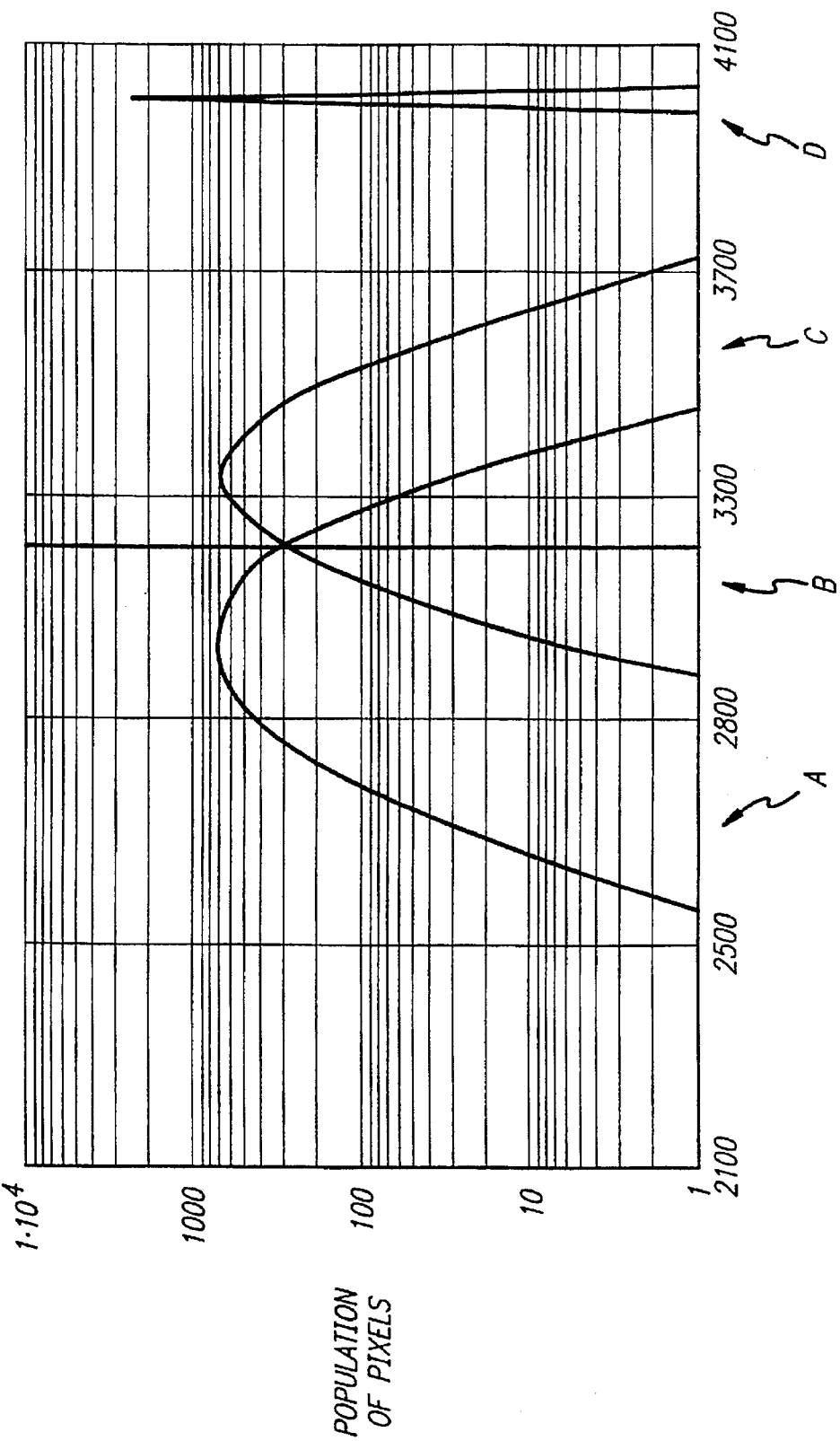
FIGS. 7 shows how histogram data from the data analysis circuit can be used in the determination of the optimal programmable convergence target for responsivity equalization calibration in accordance with the teachings of the present invention.

FIGS. 7 shows how histogram data from the data analysis circuit 64 can be used in the determination of the optimal programmable convergence target for responsivity equalization calibration in accordance with the teachings of the present invention. The abscissa (x-axis) is "ADC codes". The ordinate (y-axis) is "Population of Pixels". The maximum gain histogram is shown at "A", the optimal convergence target is shown at "B", the minimum gain histogram is shown at "C" and the dead pixels are identified at "D".

Processing Control Digital Circuitry.

The processing control circuitry 66 of the invention was originally implemented in the illustrative implementation as a part of the NUC Module 44 with the calibration mode controls, programmable calibration constants, and filter constants ultimately originating from the system controller 80. The processing control circuit functions are mainly timing and control functions which generated the signals needed to properly control the memory and computational functions during imaging and calibration. Specifically, the circuitry accepts timing and control signals from the FPA Timing Circuit 88 and generates the addresses and control signals for reading the LE and RE memories during imaging mode, and for reading and writing the LE and RE memories during calibration mode using counters. It applies the parameters and control signals to the calibration digital circuitry (58, 60, 62, 64, 68, 70, 72, 74, 76, 78) to select the correct operating mode, with the correct data routing configuration using the digital switches (68, 70, 76, 78), and correct computation.

System Controller.

Most of the algorithmic processes such as finding the optimal programmable convergence targets for the LE and RE calibrations, and determining if the calibration process has converged by evaluating histograms from the data analysis circuit are performed in software by the system controller 80, a separate circuit card from the APM 42 and NUC processor 44. The system controller 80 provided mode commands, programmable convergence targets, filter constants, and constant values for the LE and RE DAC to the process control circuit to provide the top level control of the calibration and imaging processes. The system controller can be characterized as a generic microprocessor based computer which has enough computational capability and speed to compute the standard deviation from the histograms in a timely manner, and convey operating modes such as image or calibration from the control panel to the NUC processor 44, and is used from numerous functions in the system besides controlling the closed loop calibration hardware.

Closed Loop Calibration Procedure

The methods used to apply the calibration circuit 40 as described above to calibrate the output of an IR FPA are summarized in four steps:

1) calibration of the analog circuits;
2) calibration of the level equalization data for the FPA 12 for first temperature;

3) calibration of the responsivity equalization data for the FPA 12 for second temperature; and
4) recalibration of the level equalization data for the FPA 12 for a third temperature between the first two.

In all of the steps the input to the system 40 must be changed prior to progressing to the next step, so the processing control circuit 66 must be switched to a non-calibration state (i.e. imaging) between input changes.

Calibrating the Analog Circuits

Locating the computational zero of the analog multiplier is important in obtaining maximum accuracy in the RE calibration. The computational zero is the input to the analog multiplier such that any setting of the RE input will yield the same output. Since this point is the only one that remains fixed when RE is changed, it is the point that the transfer function pivots around when RE calibration is performed. By finding the corresponding ADC code for this multiplier input and using it for the LE calibration programmable convergence target, any interaction between the LE and RE calibrations can be prevented.

A constant value, such as ground, is applied to the input of the analog summer 48.

The system controller 80 configures the NUC process control circuit 66 to present constant values to the LE and RE DACs. It sets the LE DAC to an arbitrary initial value, usually midscale, and the RE DAC to maximum gain.

The system controller 80 reads the value of the ADC codes from the data analysis circuit 64 for both maximum and minimum RE settings and updates the LE setting via the processing control circuit 66 using the following computation:

$$LE(t+1) = LE(t) + \frac{ADC\ CODE_{at\ RE\ maximum} - ADC\ CODE_{at\ RE\ minimum}}{2^N} \quad [8]$$

The system controller 80 iterates equation [8]. When the error ADC $CODE_{at\ RE\ maximum}$–ADC $CODE_{at\ RE\ minimum}$ approaches zero, and ADC $CODE_{at\ RE\ maximum}$ converges to within a predetermined number of bits (probably specified relative to the measured noise floor of the analog circuitry, which can be obtained by computing the standard deviation of a histogram of the ADC data at maximum gain RE), the system controller 80 saves value ADC $CODE_{at\ RE\ maximum}$, and uses that as the programmable convergence target for the subsequent LE calibration.

Calibrating the Level Equalization.

The IR FPA is illuminated with a uniform temperature black body at the first calibration temperature $T_1$.

The system controller 80 configures the processing control circuit 66 to configure the digital circuits for LE calibration mode, the programmable convergence target to the value found in the Calibration of Analog Circuits step, the filter constant FC to a positive value less than (maximum LE memory value)/(maximum ADC value), and to output a constant maximum gain value to the RE DAC 54.

The system controller 80 allows the calibration to proceed, while monitoring the the ADC 56 output with the data analysis circuit 64. Optionally, the system controller may apply smaller filter constants as the calibration proceeds to maximize noise filtering. When a large majority of all the pixels are with in a prescribed tolerance (based on spacial noise specifications) of the programmable convergence target, the system controller 80 terminates the calibration.

Calibrating the Responsivity Equalization.

The IR FPA is illuminated with a uniform temperature black body at the second calibration temperature $T_2$.

The system controller 80 configures the processing control circuit 66 to configure the digital circuits to output the LE memory data to the LE DAC 50 for imaging mode, and to output a constant maximum gain value to the RE DAC 54.

The system controller 80 used the data analysis hardware 64 to acquire a histogram of one image of ADC codes of pixels. The system controller 80 examines the histogram and determines the lowest amplitude usable pixel output in the histogram by searching bins about three standard deviations below the average. This value is saved as $PCT_{MAX}$, the maximum amplitude that minimum responsivity pixels at this temperature can be corrected to.

The system controller 80 configures the processing control circuit 66 to configure the digital circuits for LE imaging mode, and to output a constant minimum gain value to the RE DAC 54.

The system controller 80 used the data analysis hardware 64 to acquire a histogram of one image of ADC codes of pixels. The system controller 80 examines the histogram and determines the greatest amplitude usable pixel output in the histogram by searching bins about three standard deviations above the average. This value is saved as $PCT_{MIN}$, the miimum amplitude that maximum responsivity pixels at this temperature can be corrected to.

If $PCT_{MAX}$ is at a more responsive ADC code than $PCT_{MIN}$, the system controller 80 configures the processing control circuit 66 to set the programmable convergence target to $PCT_{MAX}$ for RE calibration. If $PCT_{MAX}$ is at a less responsive ADC code than $PCT_{MIN}$, pixels at the extremes of the histogram must be discarded to make $PCT_{MAX}$ equal to $PCT_{MIN}$, by examining which bins have the lowest populations of pixels. Thus $PCT_{MAX}$ can be decremented, or $PCT_{MIN}$ can be incremented, until they are equal. The system controller 80 configures the processing control circuit 66 to set the programmable convergence target for the RE calibration to this value.

The IR FPA is illuminated with a uniform temperature black body at the second calibration temperature $T_2$.

The system controller 80 configures the processing control circuit 66 to configure the digital circuits for RE calibration mode, the programmable convergence target to the value above, and to output the LE memory to the LE DAC 50. Assume the gain of the RE increases with ascending RE codes. If the ADC codes change in the positive direction between the temperatures $T_1$ and $T_2$ the filter constant is set to a negative value between –(maximum RE memory value)/(maximum ADC value) and zero. If the ADC codes change in the positive direction between the temperatures $T_1$ and $T_2$ the filter constant is set to a positive value between 0 and (maximum RE memory value)/(maximum ADC value).

The system controller 80 allows the calibration to proceed, while monitoring the the ADC 56 output with the data analysis circuit 64. Optionally, the system controller may apply smaller filter constants as the calibration proceeds to maximize noise filtering. When a large majority of all the pixels based on the standard deviation, or other metric, of the histogram) are with in a prescribed tolerance (based on spatial noise specifications) of the programmable convergence target, the system controller 80 terminates the calibration.

Recalibrating LE Equalization for a Particular Operating Temperature.

The IR FPA is illuminated with a uniform temperature black body at the third calibration temperature $T_3$, which lies between the other two calibration termperatures.

The system controller 80 configures the processing control circuit 66 to configure the digital circuits for imaging mode, to output the LE memory data to the LE DAC 50, and to output the RE memory data to the RE DAC 54.

The system controller 80 uses the data analysis hardware 64 to acquire a histogram of 1 image of ADC codes of pixels. The system controller 80 calculates the mean of the histogram and supplies this value to the processing control circuit 66 as the programmable convergence target. Alternatively, the programmable convergence target might be the one found in the Calibration of Analog Circuits step used for the $T_1$ calibration.

The system controller 80 configures the processing control circuit 66 to configure the digital circuits for LE calibration mode, to output the LE memory data to the LE DAC 50, and to output the RE memory data to the RE DAC 54, and the filter constant to a positive value between 0 and (maximum LE memory value)/(maximum ADC value).

The system controller 80 allows the calibration to proceed, while monitoring the ADC 56 output with the data analysis circuit 64. Optionally, the system controller may apply smaller filter constants as the calibration proceeds to maximize noise filtering. When a large majority of all the pixels are with in a prescribed tolerance of the programmable convergence target, the system controller 80 terminates the calibration.

Calibration of Analog Circuits:

1) A constant input, such as ground, is applied to the analog input to the circuit 40.
2) The system controller 80 directs the processing control circuit 66 to select constant values (rather than level equalization and responsivity equalization memory values) as inputs to the level equalization and responsivity equalization DACs 50 and 54.
3) The system controller 80 directs the processing control circuit 66 to select a value for the level equalization DAC 50 and monitors the output of the ADC 56 using the data analysis circuitry 54 for minimum and maximum responsivity equalization DAC values.
4) The system controller 80 varies the constant level equalization DAC value applied by the processing control circuit, either by an ascending or descending binary code sequence (a ramp), by a binary search, or by a recursive computation, as was described before, to find the level equalization DAC value which results in an ADC output which varies least with a change between minimum and maximum RE DAC values. The system controller 80 directs the processing control circuit 66 to save the ADC output value for this final level equalization DAC value and the maximum responsivity equalization DAC value. This value is the level equalization programmable convergence target.

Calibration of level equalization data for IR FPA at first temperature:

1) The analog output of the FPA 12 is connected to the analog input of the circuit 40.
2) The FPA is illuminated with a uniform temperature infrared source.
3) The system controller 80 directs the processing control circuit 66 to configure the circuit 40 as follows:
   a) The current values of the level equalization memory are supplied to the level equalization DAC 50.
   b) The ADC 56 outputs are processed by the digital subtracter 58, rescaling logic 60 and digital summer 62 to generate an updated value for each entry of the level equalization memory.
   c) The outputs of the digital summer, which are the updated level equalization memory values, are written back to the equalization memory at their appropriate locations, at an appropriate time.
   d) The value of the programmable convergence target PCT is set to the level equalization programmable convergence target found in Analog Circuit calibration.
   e) The filter constant is set to a positive value less than (maximum LE memory value)/(maximum ADC value).
4) The processing control circuit 66 permits the calibration circuit 40 to continue updating the level equalization memory either for a predetermined time or, by monitoring the ADC 56 output using the data analysis circuit 64, to determine if enough level equalization corrected pixels are within a pre-determined tolerance of the convergence target or that the standard deviation of the distribution has stopped decreasing.

Calibration of responsivity equalization data at a second temperature:

1) The analog output of the FPA 12 is connected to the analog input of the circuit 40. The FPA 12 is illuminated with a uniform temperature IR source, at a temperature different from that of the level equalization data calibration temperature.
2) The system controller 80 directs the processing control circuit 66 to configure the circuit 40 as follows:
   a) The values obtained in the calibration of level equalization data at first temperature are supplied to level equalization DAC 50.
   b) The current values of the responsivity equalization memory 74 are supplied to the responsivity equalization DAC 54.
   c) The ADC 56 outputs and responsivity equalization memory data are processed by the computational circuits (58, 60, 62) to generate an updated value for each entry of the responsivity equalization memory.
   d) The outputs of the digital summer 62, which are the updated responsivity equalization memory values, are written back to the responsivity equalization memory 74 at the appropriate locations at an appropriate time.
   e) The value of the digital subtracter's convergence target is set to the ADC code of the lowest responsivity correctable pixel when the responsivity equalization DAC value is set to maximum. This is found using the data analysis circuit 64 or may be predetermined.
   f) The value of the rescaling logic filter constant FC is set to a positive value or negative value of magnitude less than (maximum RE memory value)/(maximum ADC value), depending on the FPA 12 and the analog circuitry. If the ADC input voltage goes positive between $T_1$ and $T_2$, then FC is negative. If the ADC input voltage goes negative between $T_1$ and $T_2$, then FC is positive.
3) The system controller directs the processing control circuit 66 to permit the circuit 40 to continue updating the responsivity equalization memory 54 either for a predetermined time, or by monitoring the ADC 56 output using the data analysis circuit 64 to determine if enough responsivity equalization corrected pixels are within a determined tolerance of the convergence target or that the standard deviation of the distribution has stopped decreasing.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A calibration system for a staring imaging sensor having an array of detectors, the system comprising:
   first means for storing a value representing the level of a first output of each detector in response to the illumination of said detector by a first target;
   second means for storing a value representing the responsivity of each detector in response to said illumination of said detector by said first target;
   third means responsive to the first means for adjusting the level of the output of each detector in response to a second target and providing a level adjusted signal in response thereto;
   fourth means responsive to said second means for adjusting the responsivity of each detector in response to said second target and providing a responsivity adjusted signal in response thereto;
   fifth means for feeding the output of said third means back to said first means; and
   sixth means for feeding the output of said fourth means back to said second means.

2. The invention of claim 1 wherein said fifth and said sixth means include a digital subtracter for adjusting the outputs of said third means and said fourth means by a convergence target.

3. The invention of claim 2 including means for rescaling the output of said digital subtracter by filter constant.

4. The invention of claim 3 including data analysis means for analyzing the output of said third means and said fourth means to provide a histogram of data.

5. The invention of claim 4 including processing control means for providing said convergence target and said filter constant in response to said histogram.

6. The invention of claim 5 wherein said processing control means includes means for selectively providing a level equalization constant to said first means and a responsivity equalization constant to said second means.

7. The invention of claim 5 wherein said processing control means includes means for selectively providing a level equalization constant and a responsivity equalization constant to the output of said rescaling logic means.

8. The invention of claim 1 further including saturation logic for identifying dead detectors.

9. The invention of claim 1 including data analysis means for analyzing the output of said third means and said fourth means to provide a histogram of data.

10. The invention of claim 9 wherein said data analysis means includes means for using pixels in a selected region of the image to provide a histogram.

11. The invention of claim 1 including means for using pixels in a selected region of the image to provide a range count.

12. The invention of claim 1 including means for providing a count of pixels ADC codes within a selected range.

* * * * *